United States Patent
Nachiappan et al.

(10) Patent No.: US 10,152,542 B2
(45) Date of Patent: Dec. 11, 2018

(54) RANKING AND ORDERING OF USER GENERATED CONTENT

(75) Inventors: Nachi Nachiappan, Bangalore Karnataka (IN); Hemanth Sambrani, Bangalore Karnataka (IN)

(73) Assignee: Oath Inc., New York, NY (US)

( * ) Notice: Subject to any disclaimer, the term of this patent is extended or adjusted under 35 U.S.C. 154(b) by 57 days.

(21) Appl. No.: 13/442,036

(22) Filed: Apr. 9, 2012

(65) Prior Publication Data
US 2013/0268536 A1    Oct. 10, 2013

(51) Int. Cl.
*G06F 17/30* (2006.01)
*G06Q 50/00* (2012.01)

(52) U.S. Cl.
CPC ....... *G06F 17/30867* (2013.01); *G06Q 50/01* (2013.01)

(58) Field of Classification Search
CPC ......... G06F 17/30554; G06F 17/30867; G06F 17/30; G06Q 50/01
USPC .................................................. 707/741, 748
See application file for complete search history.

(56) References Cited

U.S. PATENT DOCUMENTS

| | | | |
|---|---|---|---|
| 7,565,367 B2* | 7/2009 | Barrett et al. | |
| 2008/0147483 A1* | 6/2008 | Ji | 705/10 |
| 2009/0259526 A1* | 10/2009 | Bechtel et al. | 705/10 |
| 2011/0022602 A1* | 1/2011 | Luo et al. | 707/748 |

FOREIGN PATENT DOCUMENTS

WO    WO 2011019295 A1 *  2/2011

* cited by examiner

*Primary Examiner* — Kristopher Andersen
(74) *Attorney, Agent, or Firm* — Cooper Legal Group, LLC

(57) ABSTRACT

Ordering user generated content includes: calculating a rank of the user generated content associated with an on-line property, the calculating based on a calculated freshness score and reputation metrics; storing the calculated rank as an indexed field; receiving a request to serve the on-line property; at run-time, sorting the user generated content by rank using the indexed field; and presenting the sorted user generated content along with the requested on-line property.

19 Claims, 7 Drawing Sheets

Rank of a content, $$R_c = Freshness + a * Reputation$$

where, $$Freshness = \frac{T_{submission}}{TimeDecay}$$

$$Reputation = (Reputation_{current} - Reputation_{default}) * 10^{ReputationStayingPower}$$

$$Reputation_{current} = (U_{rating} + Engagement) * Confidence_{Wilson} + Reputation_{contributor}$$

$Reputation_{default} = 0.2$ (value between current reputation of 1 thumbs-up $$a = \begin{cases} +1 & \text{if } Reputation_{current} > Reputation_{default} \\ -1 & \text{if } Reputation_{current} < Reputation_{default} \end{cases}$$

and 1 thumbs down in Wilson's).

Calculate rank of UGC for every event.
210

↓

Store the calculated rank as an indexed field.
220

↓

Receive request to serve property.
230

↓

Sort the UGC by rank using indexed field.
240

↓

Fetch the sorted UGC.
250

↓

Display sorted UGC.
260

RANKING AND ORDERING OF USER GENERATED CONTENT

CROSS-REFERENCE TO RELATED APPLICATIONS

None.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of on-line content, and more particularly relates to the field of user generated content.

BACKGROUND OF THE INVENTION

User generated content (UGC) such as photos, videos, comments, status updates and shared links dominates the latest evolution of the Internet. Yahoo! and other internet companies receive large amounts of user generated content but can display only a few of them in a page of context, along with pagination support for showing more posts. The content that is shown is primarily time-driven (most recent) or community ratings driven (number of thumbs-up). In some circumstances, a complex off-line batch job computes the most popular comments and displays them.

UGC plays a key role in increasing engagement and provides an avenue of participation for end users. Users of Yahoo! post millions of comments every week. Top stories in Yahoo! routinely generate 10K+ comments regularly. The March 2011 Japan tsunami story alone generated 100 k comments. Unique visitors to Yahoo! News site number more than 10 million daily. A large fraction of these visitors (estimates as large as 99%) read the comments.

The default view for displaying UGC is chronologically. This method results in either static content on the first page (oldest first) or too much spam/low-quality posts on the first page (newest first). Other sort orders like "highest rated by community" suffer from some deficiencies and first mover advantage. The re-use of slug-ids (on-line content topics) by news, which are used as identifiers for the commenting widget, results in comments from old, and sometimes unrelated, articles to be shown with newer ones.

For example, Reuters, the news agency, continues updating the same article slug-id, "obama_healthcare" with the latest developments. Comments from the original version of the article, when attached to the latest article, appear irrelevant and even appear to contradict the story. The consequence of this is a bad end user experience. To address this issue and that of user-gratification (of seeing their latest comment in the first page) the default sort order was changed to reverse chronological. Though contributions increased, it resulted in a severe drop of comment quality, with lots of spam, trolls, and off-topic comments. Additionally it put additional strain on customer care; not to mention a qualitative adverse effect on search engine ranking.

There is a need for a ranking method of presenting user generated comments that balances quality and freshness without increasing performance overhead.

SUMMARY OF THE INVENTION

Briefly, according to an embodiment of the present invention, a method for ordering user generated content includes steps or acts of: calculating a rank of the user generated content associated with an on-line property, said calculating based on a calculated freshness score and reputation metrics; storing the calculated rank as an indexed field; receiving a request to serve the on-line property; at run-time, sorting the user generated content by rank using the indexed field; and presenting the sorted user generated content along with the requested on-line property.

According to another embodiment of the present invention, an information processing system for ordering user generated content includes: storage, a memory with computer executable instructions stored therein; and a processor device operably coupled with the memory. The processor device is configured to perform the computer-executable instructions stored in memory, which include the method steps above.

According to another embodiment of the present invention, a computer program product includes a computer readable storage medium with computer executable stored therein. The computer executable instructions, when executed, enable a computer to perform the method steps for ordering user generated content.

BRIEF DESCRIPTION OF THE SEVERAL VIEWS OF THE DRAWINGS

To describe the foregoing and other exemplary purposes, aspects, and advantages, we use the following detailed description of an exemplary embodiment of the invention with reference to the drawings, in which:

FIG. 1 shows a formulae for calculating a rank of user generated content, according to an embodiment of the present invention;

FIG. 2 is a high-level flowchart of a method for ranking user-generated content, according to an embodiment of the invention;

Figure 3:
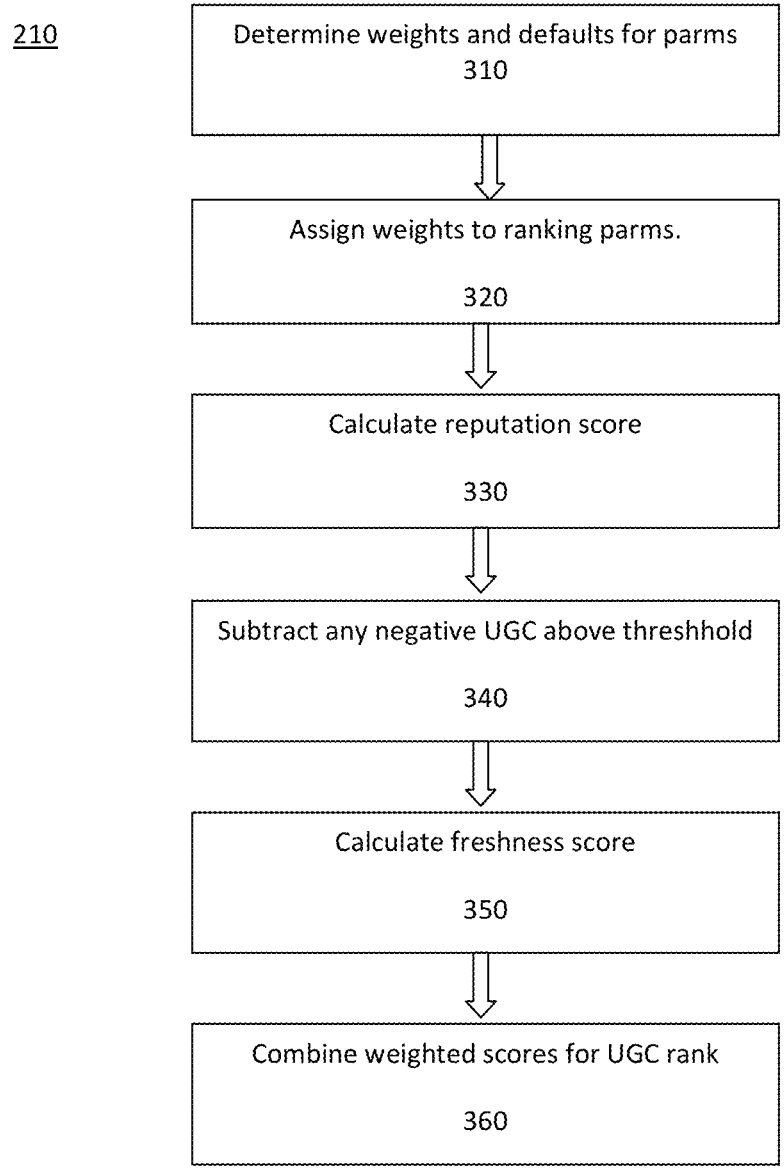
FIG. 3 is a flowchart of a ranking method, according to an embodiment of the present invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Before describing in detail embodiments that are in accordance with the present invention, it should be observed that the embodiments reside primarily in combinations of method steps and system components related to systems and methods for placing computation inside a communication network. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

We describe a real-time ranking method for user generated comments that balances quality and freshness, without performance overhead. This method can be implemented in a generic way that other semantics (messages, reviews) can also use. We compute the ranking of the user generated content based on freshness and reputation, using the following parameters:

Users' ratings (thumbs-up, thumbs-down, abuse reports);
Engagement (the number of replies it generates);
the Contributor's reputation; and
Freshness of the content (as determined by the time at which it was submitted).

The formulae for calculating the rank is shown in FIG. 1. The premise behind the formulae is as follows: content with a favorable rating, as chosen by users based on reputation metrics (ratings, replies, abuse reports), should stay on top, but not forever. At the same time, newer, fresher content should get an opportunity for contention at higher ranks for visibility and hence popularity. In this formulae, weights for both freshness and reputation metrics are adjustable such that at one extreme this can be purely time ordered (newest first) and at the other extreme, purely based on reputation (highest rated).

All parameters in the ranking equation described above are configurable per property. Thus properties can tune the behavior depending on factors such as the longevity of the article (the content) and the rate at which they receive the content in order to provide more/less weight to freshness and reputation. We also adjust the weighting of the current reputation if it has a lower rating than a default reputation. In that case, the current reputation will be subtracted in calculating the overall rank. This is done to amplify the effect of the negative reputed content in rank.

Here are two scenarios for adjusting weights for freshness and reputation for two different properties:

1. Yahoo! News receives lots of comments on a new (fresh) article. Here the weightage for freshness can be higher (to give opportunity to a comment submitted now compared to one which was submitted 1 hour ago). For e.g., for a comment submitted at 10:00 AM having a reputation score of 0.7 the rank will be lower than a comment which is submitted at 11:00 AM (1 hour later than the previous comment) with a reputation score of 0.6 because more weight is given to the fresher post. In the news industry it is known that old articles get less page-views and less comments (90% comments happen in first day), thus this works well for this property.

2. Yahoo! Autos articles ("What is the best Economical Car of 2012?") receives less number of comments and also the articles live longer. The comments appear sporadically over many weeks. Here the weightage for freshness can be lower. For e.g., a comment submitted on 2nd February with reputation score of 0.7 will still rank higher than a comment which is submitted on 9th February (1 week later than previous comment) with a reputation score of 0.6.

Thus the weights for freshness and reputation can be fine tuned by the property based on the rate of comments, longevity of articles, etc.

The traditional calculation of reputation of content based on number of thumbs-up/total-rating suffered from lack of sufficient ratings data: for example, 1 thumbs-up and 0 thumbs-down is better than 9 thumbs-up and 1 thumbs-down. Hence we calculate the rating based on Wilson's score with confidence value of 95%.

Referring now to FIG. 2, we show a high-level flowchart 200 of a method for ranking user generated content, according to an embodiment of the present invention. In step 210, we calculate the rank of a UGC for every event involving the UGC. The UGC can be a comment made by a user on an on-line property such as an article or news story. The UGC can also be a review such as a movie review, book view, music review, and the like. The UGC can be a suggestion or a message such as a message made in reply to a post.

We compute the rank independently of the number of comments on an article (or reviews for a movie, replies to a post, and the like). Time sensitivity and user reputation ensures that comments that don't have a lot of ratings because they just came into existence have a chance to contend with those that have ratings. Comments should be of high quality and they should add to the content to contribute to the search engine ranking. At the same time opportunities should be given for new comments to gain visibility in order to encourage participation from users. Also, every event, be it a rating, reply or abuse report, will compute a new ranking of the target comment without having an impact on the ranks of other comments; hence the mechanism scales really well.

The rank is calculated every time an event occurs in relation to the UGC. For example, some events are: creation of a comment, a rating/abuse report for a comment, and a reply to a comment or post. In step 220 we store the calculated rank as an indexed field. At read time (run-time), the list of comments is ordered merely by sorting those pre-computed ranks. Efficiency is guaranteed because the rank field is already indexed.

In step 230 we receive a request to serve the property, including the UGC associated with it. At this time at step 240, we sort the UGC by rank using the indexed field, in real-time. In step 250 we fetch the sorted UGC, and then in step 260 we display the sorted UGC.

Calculation of Rank.

Referring now to FIG. 3, we show a flowchart of step 210 from the flowchart 200 of FIG. 2, calculating a rank of UGC for every event. The rank for each content item is computed independently of other content items, leading to a highly scalable system. The rank is calculated every time an action happens on the content (like creation of the content, rating/abuse-report on the content and reply to the content). Thus, it is highly efficient and real-time. The rank is computed and stored as an indexed field in an indexed data store. We use an internal vertical/structured document search engine which provides a reverse-index on declared fields. When used for comment ranking, this search engine is used as a secondary index source for sorting comments based on their rank. This is equivalent to a database column indexed and used as a sort key field. When we fetch the comments on an article, sorted by rank, at serving time, we are merely using this indexed field to sort the comments. The sequence diagram in FIG. 3 shows the rank calculation for rating action and fetching comments based on rank.

In step 310 we need to know the weights we will assign to the engagement and freshness metrics and we also need to know the default values for those metrics. This can be calculated using the formulae, or these values can be retrieved from existing models. In step 320 we assign the weights to the parameters we use in the ranking.

We calculate a reputation score in step 330. The reputation portion of the UGC scoring is calculated based on the user's thumbs-up, thumbs-down, and abuse-report counts. Abuse reports are counted as a thumbs-down. Replies are also treated as thumbs-up (if the overall percentage of users who liked the content is above a configurable threshold). We use the engagement metrics and their assigned weights to provide an initial reputation score. From this initial reputation score, in step 340 we subtract any user-generated content that is very negative. The content is considered very negative if it exceeds a default value by a pre-determined threshold. This provides the final reputation score.

In step 350 we calculate the freshness score. This is computed as the time of submission divided by time decay. Time Decay is the parameter used in calculating the comment's freshness contribution to the overall score. We simply divide the comment submission time by this value to calculate the freshness score (which is added to the overall rank). By configuring a high value of time decay the weightage of freshness in the overall rank is reduced (and vice versa—low value of time decay results in high weightage for freshness in the overall rank). This is a configured value for a property (or can be derived by experiments/models). As explained above a time decay value will be configured as a low value for Yahoo! News (to provide more weightage to freshness) and will be configured as a high value for Yahoo! Autos (to give less weightage to freshness).

In step 360 we combine the final weighted reputation score with the calculated freshness score to generate a rank for the UGC.

Figure 4:
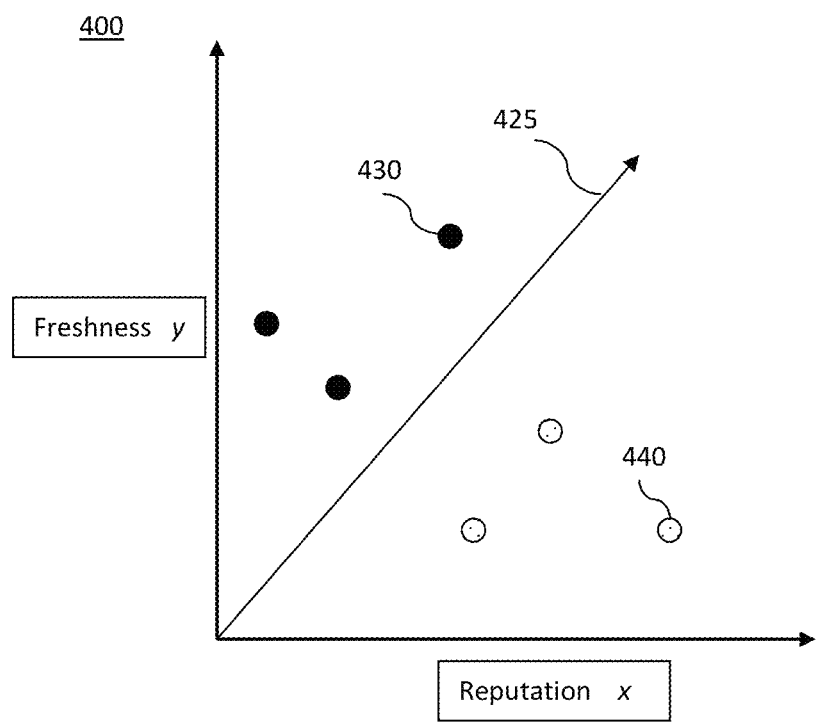
FIG. 4 is a graph of weights for freshness and engagement metrics, according to an embodiment of the present invention.
Figure 5:
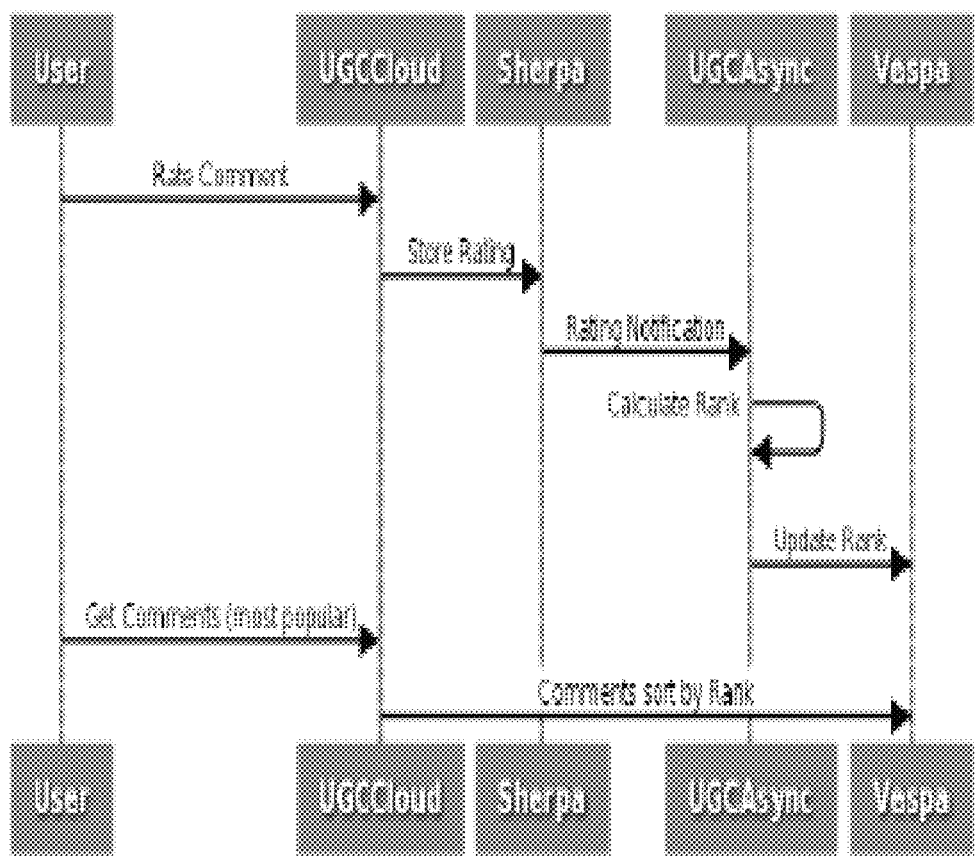
FIG. 5 shows a sequence diagram of ranking a comment, according to an embodiment of the present invention.

FIG. 4 shows a graphical illustration of the freshness and reputation parameters mapped as (x, y) coordinates. As the graph 400 shows, the freshness and reputation coordinates can be weighted more heavily on the freshness side (the y axis) or the reputation side (the x axis). The x, y coordinates more heavily weighted toward freshness (y) are the dark dots 430. The x, y coordinates more heavily weighted toward engagement (x) are the light dots 440. Any x, y coordinates equally weighted for freshness and engagement would lie along line 425.

Figure 7:
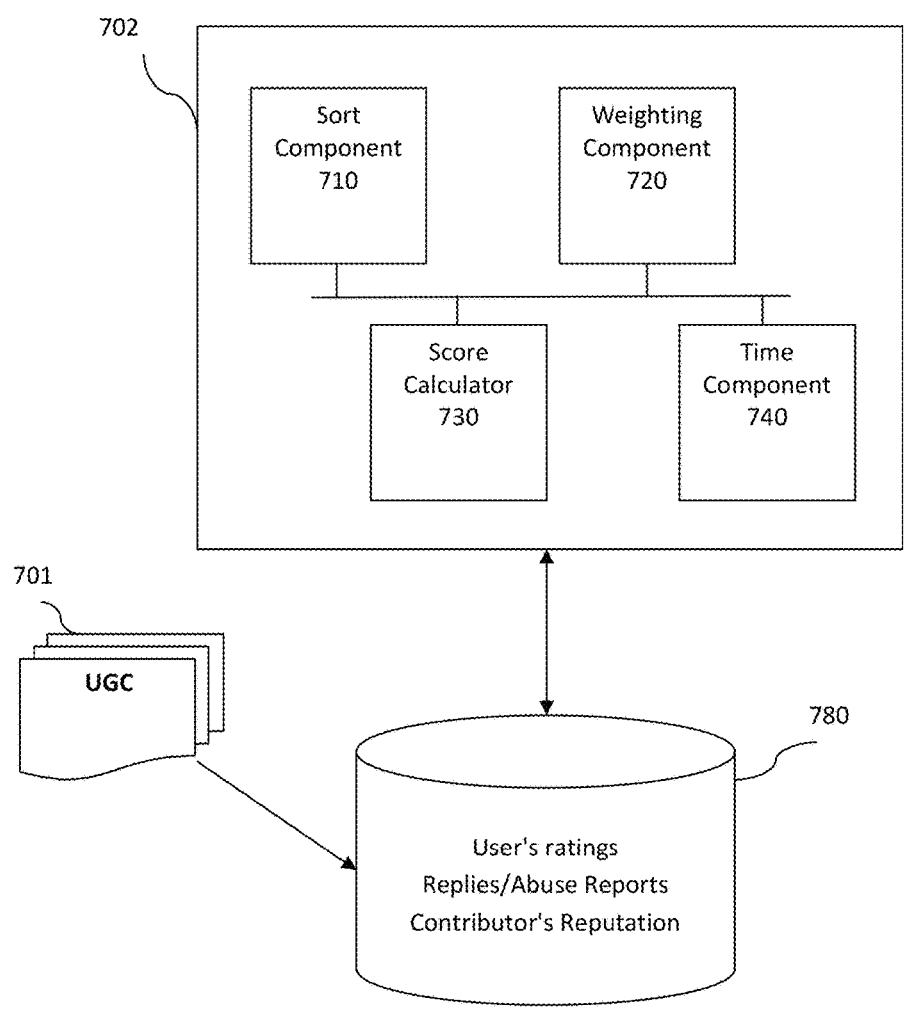
FIG. 7 is a simplified block diagram of components of the system configured to operate according to an embodiment of the invention.

FIG. 7 shows a simplified block illustration of the components of a system configured to operate according to an embodiment of the present invention. Block 702 contains four exemplary components: a sort component 710, a weighting component 720, a score calculator 730, and a time component 740. These components represent a processor and although depicted separately, may actually be incorporated as one processing component. The block device 702 is operably coupled with storage 780. Storage 780 stores the UGC 701 and the values for the metrics, such as: user's ratings, replies/abuse reports, and the contributor's reputation.

Hardware Embodiment.

Figure 6:
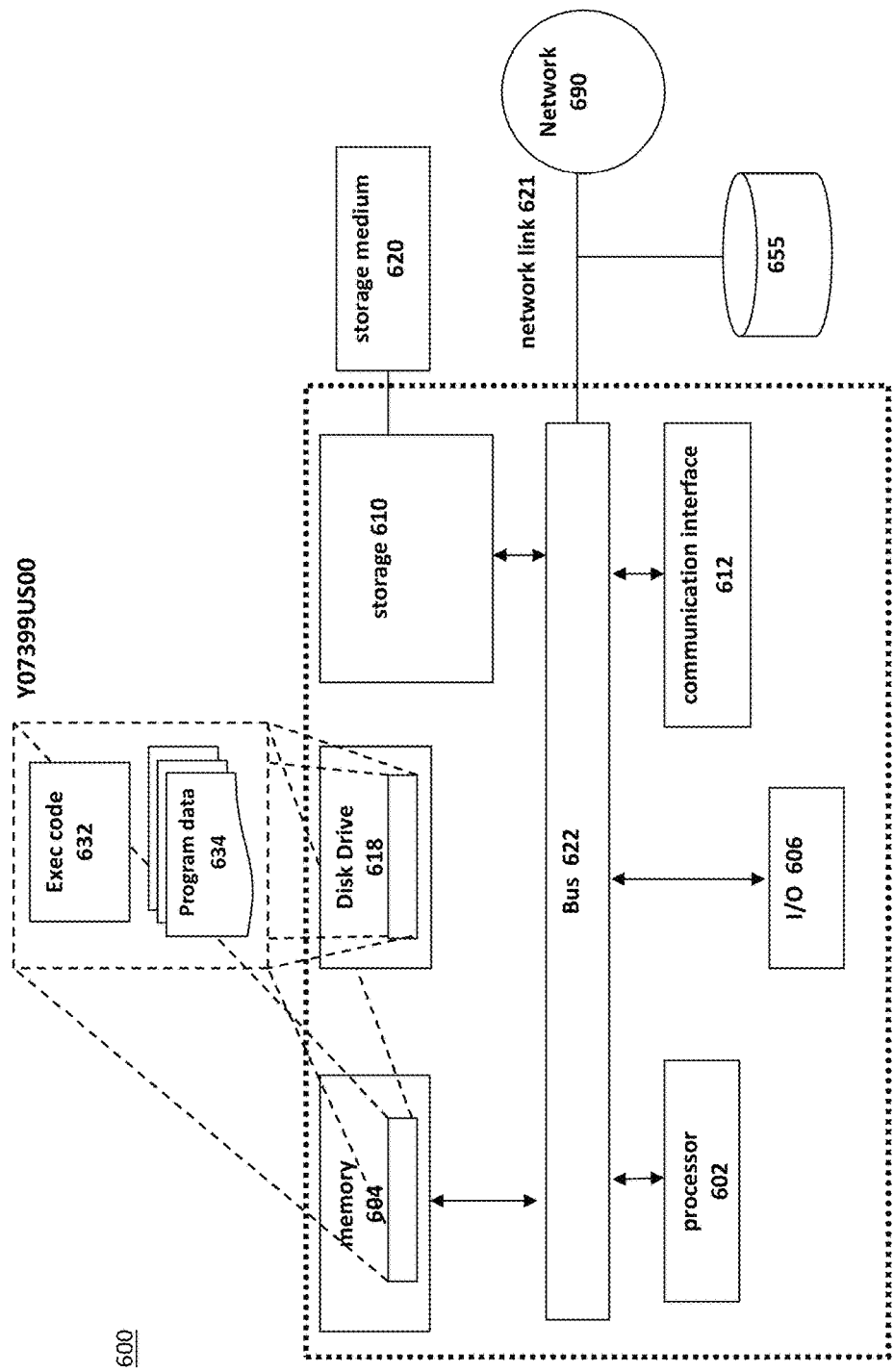
FIG. 6 is a high level block diagram showing the hardware configured to operate according to an embodiment of the present invention.

Referring now in specific detail to the FIG. 6, there is provided a simplified high-level block diagram of an information processing system 600 for ranking and ordering of user generated content in which the present invention may be implemented. For purposes of this invention, computer system 600 may represent any type of computer, information processing system such as system 700 of FIG. 7, or other programmable electronic device, including a client computer, a server computer, a portable computer, an embedded controller, a personal digital assistant, and so on. The computer system 600 may be a stand-alone device or networked into a larger system. Computer system 600, illustrated for exemplary purposes as a networked computing device, is in communication with other networked computing devices (not shown) via network 690. As will be appreciated by those of ordinary skill in the art, network 690 may be embodied using conventional networking technologies and may include one or more of the following: local area networks, wide area networks, intranets, public Internet and the like.

Throughout the description herein, an embodiment of the invention is illustrated with aspects of the invention embodied solely on computer system 600, for simplicity. As will be appreciated by those of ordinary skill in the art, aspects of the invention may be distributed amongst one or more networked computing devices which interact with computer system 600 via one or more data networks such as, for example, network 690. However, for ease of understanding, aspects of the invention have been described as embodied in a single computing device—computer system 600.

Computer system 600 includes processing device 602 which communicates with an input/output subsystem 606, memory 604, storage 610 and network 690. The processor device 602 is operably coupled with a communication infrastructure 622 (e.g., a communications bus, cross-over bar, or network). The processor device 602 may be a general or special purpose microprocessor operating under control of computer program instructions 632 executed from memory 604 on program data 634. The processor 602 may include a number of special purpose sub-processors such as a comparator engine, each sub-processor for executing particular portions of the computer program instructions. Each sub-processor may be a separate circuit able to operate substantially in parallel with the other sub-processors.

The memory 604 may be partitioned or otherwise mapped to reflect the boundaries of the various memory subcomponents. Memory 604 may include both volatile and persistent memory for the storage of: operational instructions 632 for execution by processor device 602, data registers, application storage and the like. Memory 604 preferably includes a combination of random access memory (RAM), read only memory (ROM) and persistent memory such as that provided by a hard disk drive 618. The computer instructions/applications that are stored in memory 604 are executed by processor 602. The computer instructions/applications 632 and program data 634 can also be stored in hard disk drive 618 for execution by processor device 602. Database 655 pictured here is a representation of storage for the feedback data, producer data, and consumer data and may be a plurality of databases operably coupled with a server network 690 such as the Internet through network link 621.

Those skilled in the art will appreciate that the functionality implemented within the blocks illustrated in the diagram may be implemented as separate components or the functionality of several or all of the blocks may be implemented within a single component. The I/O subsystem 606 may comprise various end user interfaces such as a display, a keyboard, and a mouse. The I/O subsystem 606 may further comprise a connection to a network 690 such as a local-area network (LAN) or wide-area network (WAN) such as the Internet.

The computer system 600 may also include non-transitory storage 610, representing a magnetic tape drive, an optical disk drive, a CD-ROM drive, and the like. The storage drive 610, which can be removable, reads from and/or writes to a removable storage unit 620 in a manner well known to those having ordinary skill in the art. Removable storage unit 620, represents a floppy disk, a compact disc, magnetic tape, optical disk, CD-ROM, DVD-ROM, etc. which is read by and written to by removable storage drive 610. As will be appreciated, the removable storage unit 620 includes a non-transitory computer readable medium having stored therein computer software and/or data for implementing the real-time feedback collection system.

The computer system 600 may also include a communications interface 612. Communications interface 612 allows software and data to be transferred between the computer system and external devices. Examples of communications interface 612 may include a modem, a network interface (such as an Ethernet card), a communications port, a PCM-CIA slot and card, etc. Software and data transferred via communications interface 612 are in the form of signals which may be, for example, electronic, electromagnetic, optical, or other signals capable of being received by communications interface 612.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Therefore, while there has been described what is presently considered to be the preferred embodiment, it will understood by those skilled in the art that other modifications can be made within the spirit of the invention. The above description(s) of embodiment(s) is not intended to be exhaustive or limiting in scope. The embodiment(s), as described, were chosen in order to explain the principles of the invention, show its practical application, and enable those with ordinary skill in the art to understand how to make and use the invention. It should be understood that the invention is not limited to the embodiment(s) described above, but rather should be interpreted within the full meaning and scope of the appended claims.

We claim:

1. A method for ordering a plurality of user generated content, said method comprising:
   using a processor device, performing:
   calculating ranks of the plurality of user generated content associated with an on-line property, wherein a rank of each user generated content of the plurality of user generated content is respectively calculated by:
      assigning weights to engagement metrics associated with the user generated content;
      assigning default values to the engagement metrics;
      calculating an initial reputation score of the user generated content based on the engagement metrics and assigned weights of the engagement metrics;
      calculating a reputation score of the user generated content as the initial reputation score minus negative user generated content associated with the user generated content that exceeds an assigned default value by a pre-determined threshold;
      calculating a freshness score of the user generated content as a time of submission divided by time decay;
      assigning a first weight to the freshness score and a second weight to the reputation score, wherein:
      the first weight has a first value and the second weight has a second value when the user generated content associated with the on-line property is received in association with a first type of content associated with receiving user generated content at a first rate upon publication of the on-line property; and
      the first weight has a third value and the second weight has a fourth value when the user generated content associated with the on-line property is received in association with a second type of content associated with receiving user generated content at a second rate upon publication of the on-line property, wherein:
      the second rate is different than the first rate; the first value is different than the third value; and the second value is different than the fourth value;
      computing the rank of the user generated content as a function of a weighted freshness score and a weighted reputation score, wherein the weighted freshness score is derived by applying the first weight to the freshness score and the weighted reputation score is derived by applying the second weight to the reputation score; and
      storing the rank as an indexed field in an indexed data store;
   receiving a request to serve the on-line property;
   at run-time, sorting the plurality of user generated content associated with the on-line property by rank according to the calculated ranks stored in the indexed data store; and
   presenting the plurality of user generated content in sorted order along with the requested on-line property.

2. The method of claim 1 wherein calculating a rank occurs for every event associated with the plurality of user generated content, wherein said event is selected from a group consisting of: a comment, a reply, a rating, and an abuse report; and
   wherein an abuse report is filed by one user to flag another user's comment or reply as abusive.

3. The method of claim 1 further comprising determining at least one of the first weight or the second weight based on a longevity associated with the on-line property.

4. The method of claim 1 further comprising determining that the first weight has a fifth value if the on-line property is determined to be associated with a first longevity, and determining that the first weight has a sixth value less than the fifth value if the on-line property is determined to be associated with a second longevity greater than the first longevity.

5. The method of claim 1 further comprising calculating the ranks based on longevity of the on-line property.

6. The method of claim 1 wherein the time decay changes according to the on-line property.

7. An information processing system for ordering a plurality of user generated content, comprising:
   storage;

a memory with computer-executable instructions stored therein; and a processor device operably coupled with the memory, said processor device performing the computer-executable instructions comprising:

calculating ranks of the plurality of user generated content associated with an on-line property, wherein a rank of each user generated content of the plurality of user generated content is respectively calculated by:

assigning weights to engagement metrics associated with the user generated content;

assigning default values to the engagement metrics;

calculating an initial reputation score of the user generated content based on the engagement metrics and assigned weights of the engagement metrics;

calculating a reputation score of the user generated content as the initial reputation score minus negative user generated content associated with the user generated content that exceeds an assigned default value by a pre-determined threshold;

calculating a freshness score of the user generated content as a time of submission divided by time decay;

assigning a first weight to the freshness score and a second weight to the reputation score, wherein:

the first weight has a first value and the second weight has a second value when the user generated content associated with the on-line property is received in association with a first type of content associated with receiving user generated content at a first rate upon publication of the on-line property; and the first weight has a third value and the second weight has a fourth value when the user generated content associated with the on-line property is received in association with a second type of content associated with receiving user generated content at a second rate upon publication of the on-line property, wherein:

the second rate is different than the first rate; the first value is different than the third value; and the second value is different than the fourth value;

computing the rank of the user generated content as a function of a weighted freshness score and a weighted reputation score, wherein the weighted freshness score is derived by applying the first weight to the freshness score and the weighted reputation score is derived by applying the second weight to the reputation score; and storing the rank as an indexed field in an indexed data store;

receiving a request to serve the on-line property;

at run-time, sorting the plurality of user generated content associated with the on-line property by rank according to the calculated ranks stored in the indexed data store; and presenting the plurality of user generated content in sorted order along with the requested on-line property.

8. The information processing system of claim 7 wherein calculating a rank occurs for every event associated with the plurality of user generated content, wherein said event is selected from a group consisting of: a comment, a reply, a rating, and an abuse report; and wherein an abuse report is filed by one user to flag another user's comment or reply as abusive.

9. The information processing system of claim 7 wherein calculating the ranks is performed independently of a ranking of other user generated content.

10. The information processing system of claim 7:

wherein the engagement metrics comprise at least one of: users' ratings, a contributor's reputation, number of replies, ratings, or abuse reports.

11. The information processing system of claim 7 further comprising calculating the ranks based on longevity of the on-line property.

12. The information processing system of claim 7 wherein the freshness score is a function of a time delay value and wherein the time decay changes according to the on-line property.

13. A computer program product comprising a non-transitory computer readable storage medium with computer executable instructions stored therein, said computer executable instructions causing a computer to perform:

calculating ranks of a plurality of user generated content associated with an on-line property, wherein a rank of each user generated content of the plurality of user generated content is respectively calculated by:

assigning weights to engagement metrics associated with the user generated content;

assigning default values to the engagement metrics;

calculating an initial reputation score of the user generated content based on the engagement metrics and assigned weights of the engagement metrics;

calculating a reputation score of the user generated content as the initial reputation score minus negative user generated content associated with the user generated content that exceeds an assigned default value by a pre-determined threshold;

calculating a freshness score of the user generated content as a time of submission divided by time decay;

assigning a first weight to the freshness score and a second weight to the reputation score, wherein:

the first weight has a first value and the second weight has a second value when the user generated content associated with the on-line property is received in association with a first type of content associated with receiving user generated content at a first rate upon publication of the on-line property; and the first weight has a third value and the second weight has a fourth value when the user generated content associated with the on-line property is received in association with a second type of content associated with receiving user generated content at a second rate upon publication of the on-line property, wherein:

the second rate is different than the first rate; the first value is different than the third value; and the second value is different than the fourth value;

computing the rank of the user generated content as a function of a weighted freshness score and a weighted reputation score, wherein the weighted freshness score is derived by applying the first weight to the freshness score and the weighted reputation score is derived by applying the second weight to the reputation score; and storing the rank as an indexed field in an indexed data store;

receiving a request to serve the on-line property;

at run-time, sorting the plurality of user generated content associated with the on-line property by rank according to the calculated ranks stored in the indexed data store; and presenting the plurality of user generated content in sorted order along with the requested on-line property.

14. The computer program product of claim 13:
  wherein the engagement metrics comprise at least one of: users' ratings, a contributor's reputation, number of replies, ratings, or abuse reports; and
  wherein an abuse report is filed by one user to flag another user's comment or reply as abusive.

15. The computer program product of claim 13 wherein the first weight is different than the second weight.

16. The computer program product of claim 13 wherein the first weight is greater than the second weight.

17. The computer program product of claim 13 wherein the first weight is less than the second weight.

18. The computer program product of claim 13 wherein the plurality of user generated content comprises one or more comments.

19. The computer program product of claim 13 wherein the plurality of user generated content comprises one or more reviews.

* * * * *